United States Patent [19]

Kawamura et al.

[11] Patent Number: 5,519,465
[45] Date of Patent: May 21, 1996

[54] CAMERA LENS BARREL HAVING BOTH PULSE DRIVE CONTROL AND MICROSTEP DRIVE CONTROL

[75] Inventors: Hiroshi Kawamura; Norikatsu Inoue; Kunio Nakazato; Akihito Nakayama, all of Tokyo, Japan

[73] Assignee: Sony Corporation, Tokyo, Japan

[21] Appl. No.: 224,197

[22] Filed: Apr. 7, 1994

Related U.S. Application Data

[63] Continuation of Ser. No. 784,909, Oct. 30, 1991, abandoned.

[30] Foreign Application Priority Data

Nov. 9, 1990 [JP] Japan ................... 2-305443

[51] Int. Cl.⁶ ............... G02B 7/02; G02B 15/14
[52] U.S. Cl. ............ 354/195.12; 359/694; 359/696; 359/823
[58] Field of Search ............ 354/195.1, 195.12, 354/400; 359/684, 686, 694, 696, 697, 823

[56] References Cited

U.S. PATENT DOCUMENTS

| | | | |
|---|---|---|---|
| 4,676,605 | 6/1987 | Toda et al. | 359/696 |
| 4,729,536 | 3/1988 | Scala | 248/409 |
| 4,743,931 | 5/1988 | Matsuzaki et al. | 354/400 |
| 4,799,073 | 1/1989 | Asano et al. | 354/195.12 |
| 4,812,727 | 3/1989 | Sakai et al. | 318/696 |
| 4,862,046 | 8/1989 | Preston | 318/467 |
| 4,862,203 | 8/1989 | Sasaki et al. | 354/400 |
| 5,005,956 | 4/1991 | Kaneda et al. | 359/698 |
| 5,060,001 | 10/1991 | Kaneda | 354/400 |
| 5,146,071 | 9/1992 | Ookbo et al. | 250/201.2 |
| 5,150,260 | 9/1992 | Chigira | 354/195.1 X |
| 5,206,677 | 4/1993 | Onuki et al. | 354/400 |

FOREIGN PATENT DOCUMENTS

| | | |
|---|---|---|
| 0394901 | 10/1990 | European Pat. Off. . |
| 1-196011 | 8/1989 | Japan . |
| 4-25811 | 1/1992 | Japan . |

Primary Examiner—M. L. Gellner
Assistant Examiner—J. K. Han
Attorney, Agent, or Firm—Ronald P. Kananen

[57] ABSTRACT

A camera lens barrel having a first grouped lens, a movable second grouped lens for variable magnification, a third grouped lens, and a fourth grouped lens, which are respectively arranged along an optical axis, and accommodating a drive system for the first to fourth lenses. The camera lens barrel is provided with a stepping motor, a control device capable of respectively carrying out in a low speed drive mode at least micro step drive control and pulse drive control of the stepping motor, and a moving mechanism for converting rotation of the stepping motor into movement of the second grouped lens along the optical axis. The control device carries out position control of the second grouped lens according to a control quantity of the stepping motor. As the stepping motor is driven under the micro step drive control, the generation of noise and vibration can be greatly suppressed as compared with a conventional lens barrel employing a DC motor as a drive source.

17 Claims, 1 Drawing Sheet

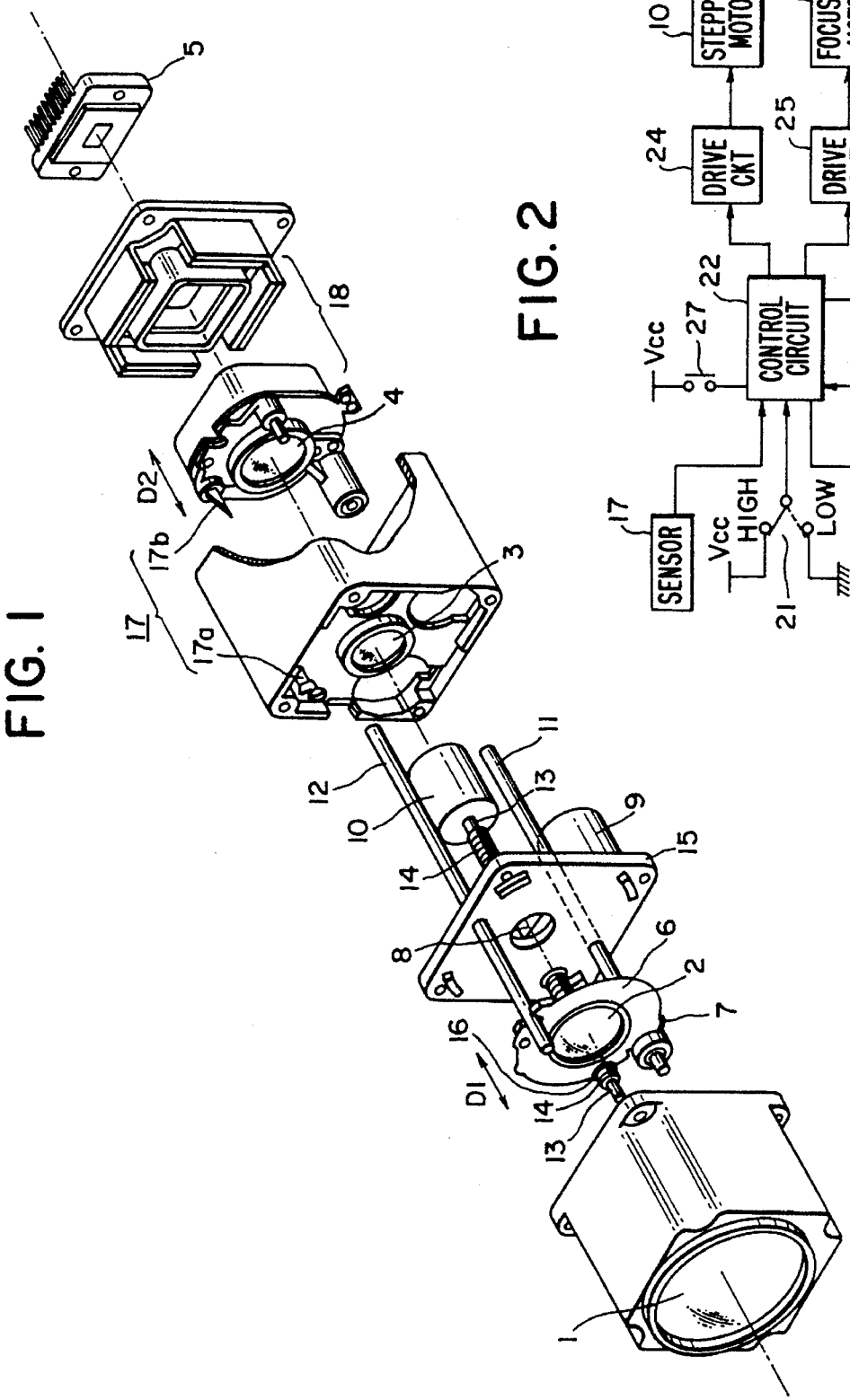
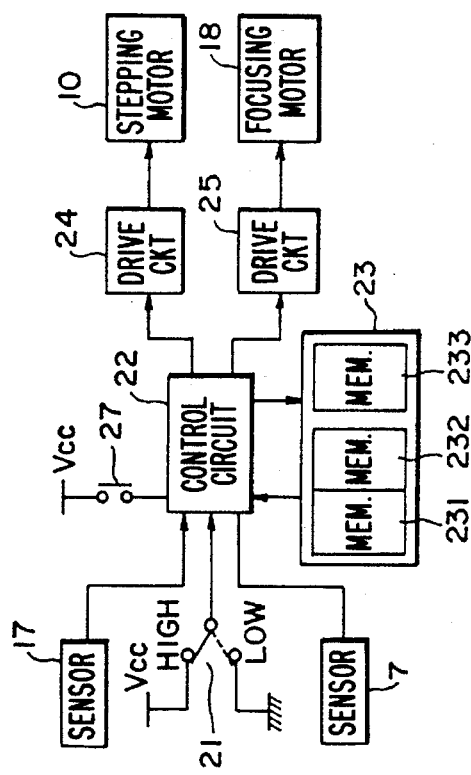

CAMERA LENS BARREL HAVING BOTH PULSE DRIVE CONTROL AND MICROSTEP DRIVE CONTROL

This application is a continuation of application Ser. No. 07/784,909 filed Oct. 30, 1991, now abandoned.

BACKGROUND OF THE INVENTION

The present invention relates to a camera lens barrel in a video camera or the like. More particularly, this invention relates to a driving device for a zoom lens in a camera lens barrel of an inner focus type having a four-group zoom lens system with an autofocus function and a motor-driven zoom function.

In a video camera having an autofocus function and a zoom function, it is increasingly demanded to have a more compact and handier construction as well as an improvement in performance. To this end, various attempts have been made to improve upon a camera lens barrel in the video camera (e.g., as shown Japanese Patent Laid-open Publication No. 1-196011 and Japanese Patent Application No. 2-130580 entitled "Camera Lens Barrel" filed by the present assignee).

As a lens system to be accommodated in the camera lens barrel a zoom lens system consisting of four groups of lenses is known. Such a four-group zoom lens system has two types. One is a front focus type such that a first grouped lens, a second grouped lens and a third grouped lens of the four groups of lenses are adapted to be moved. The other is an inner focus type such that a fourth grouped lens of the four groups of lenses has a focusing function, a correcting function and an imaging function, and that the second grouped lens and the fourth grouped lens are adapted to be moved. The present invention relates particularly to the latter inner focus type of a zoom lens system.

In a conventional camera lens barrel of the inner focus type, the second grouped lens for zooming to provide a variable magnification is moved in a direction of an optical axis along two guide shafts fixed to the lens barrel by using a DC motor, a reduction gear for reducing a rotating speed of the DC motor, and a cam, since a moving quantity of the second grouped lens is large. On the other hand, the fourth grouped lens for imaging is driven by a voice coil motor which is linearly operated.

However, when driving the second grouped lens by using the DC motor, the reduction gear, and the cam as mentioned above, there are many problems such as generation of noise to an electronic circuit in the video camera, generation of vibration in driving, low reliability of a brush of the DC motor, a difficulty in high-speed zooming, and a difficulty in providing a compact construction.

SUMMARY OF THE INVENTION

It is accordingly an object of the present invention to provide a camera lens barrel which can suppress noise and vibration.

It is another object of the present invention to provide a camera lens barrel which can ensure a high reliability.

It is a further object of the present invention to provide a camera lens barrel which can realize a high-speed zoom operation.

It is a still further object of the present invention to provide a camera lens barrel which can be made compact.

According to the present invention, there is provided in a camera lens barrel having a first grouped lens, a movable second grouped lens for variable magnification, a third grouped lens, and a fourth grouped lens, which are arranged along an optical axis, and accommodating a drive system for the first to fourth lenses; the improvement comprising a stepping motor, control means capable of carrying out at least micro step drive control of the stepping motor, and a moving mechanism for converting rotation of the stepping motor into movement of the second grouped lens along the optical axis; wherein the control means carries out position control of the second grouped lens according to a control quantity of the stepping motor.

Based on the concept of the present invention, the stepping motor can be driven under the micro step drive control, and the second grouped lens is moved by the stepping motor and the moving mechanism to be operated in response to the rotation of the stepping motor. Further, a position of the second grouped lens is calculated from a control quantity of the stepping motor.

That is, the inner focus type camera lens barrel according to the present invention is provided with a stepping motor which can be driven at least under the micro step drive control, control means, and a moving mechanism for moving the second grouped lens along the optical axis in response to the rotation of the stepping motor.

It is preferable that the control means calculates a position of the second grouped lens on the basis of a rotational position of the stepping motor corresponding to an end position of the second grouped lens and subsequently according to the control quantity of the stepping motor.

It is also preferable that the camera lens barrel of the present invention is provided with a mode switch for selecting a high-speed drive mode or a low-speed drive mode. By providing a mode switch for selecting a high-speed drive mode or a low-speed drive mode, when the high-speed drive mode is selected, the stepping motor is driven at high speeds by the control means under pulse drive control.

Accordingly, the movement of the second grouped lens can be effected with the vibration and noise suppressed by enabling the stepping motor to be driven under the micro step drive control. No complex position sensor for detecting a position of the second grouped lens is required, and the lens barrel is therefore reduced in size by utilizing a control quantity of the stepping motor for the detection of the position of the second grouped lens.

When the low-speed drive mode is selected, the stepping motor is driven at low speeds by the control means under the micro step drive control, thus suppressing the vibration and noise during the movement of the second grouped lens.

As described above, according to the present invention, the second lens in the inner focus type camera lens barrel is moved by using a stepping motor. Accordingly, the movement of the second grouped lens can be smoothly effected to thereby suppress noise and vibration. In particular, by driving the stepping motor under the micro step drive control, the generation of noise and vibration can be almost eliminated.

Further, since no complex sensor for detecting a position of the second grouped lens is required, the camera lens barrel can be made inexpensive, and it can be reduced in size.

Further, as the drive system for the second grouped lens is simple, and in particular, a diametrical size of the camera lens barrel is small, the camera lens barrel can be made even more compact.

Additionally, as the moving mechanism in the camera lens barrel does not employ any low-reliable members such as a brush, the reliability can be improved.

Other objects and features of the invention will be more fully understood from the following detailed description and appended claims when taken with the accompanying drawings.

BRIEF DESCRIPTION OF THE DRAWINGS

FIG. 1 is an exploded perspective view of a camera lens barrel according to a preferred embodiment of the present invention; and FIG. 2 is a block diagram illustrating a control system according to the preferred embodiment of the present invention.

DETAILED DESCRIPTION OF THE PREFERRED EMBODIMENT

A preferred embodiment of the present invention will now be described with reference to the drawings, in which FIG. 1 is an exploded perspective view of an inner focus type camera lens barrel according to the preferred embodiment of the present invention, and FIG. 2 is a block diagram illustrating a control system for controlling a stepping motor for driving a second grouped lens and a focus linear motor for driving a fourth grouped lens.

The camera lens barrel shown in FIG. 1 is provided with a first grouped lens 1, a second grouped lens 2, a third grouped lens 3, and a fourth grouped lens 4, which are arranged in series along an optical axis. There is provided a charge coupled device (CCD) 5 as an imaging device at a focus position of the fourth grouped lens 4. The first grouped lens 1 is a focusing lens group constituted of a plurality of lenses, e.g. two lenses, which are fixed in the camera lens barrel. The second grouped lens 2 is a zoom lens group for variable magnification constituted of a plurality of lenses, e.g., three lenses, which are movable along the optical axis. The movement of the second grouped lens 2 will be hereinafter described in detail. The third grouped lens 3 is a correcting lens group constituted of a plurality of lenses, e.g., two lenses, which are fixed in the camera lens barrel. Further, the fourth grouped lens 4 is an imaging lens group constituted of a plurality of lenses, e.g. two lenses, which are movable along the optical axis by a focusing linear motor 18.

A fixed plate 15 is provided between the first grouped lens 1 and the third grouped lens 3, both of which are fixed. A stepping motor 10 for moving the second grouped lens 2 is provided between the fixed plate 15 and the third grouped lens 3. The fixed plate 15 is provided with a through hole having a center coincident with the optical axis. There is provided adjacent to the fixed plate 15 an iris 8 for opening and closing the through hole of the fixed plate 15. An iris driving motor 9 for vertically driving the iris 8 is provided between the fixed plate 15 and the third grouped lens 3.

A frame 6 for the second grouped lens 2 is provided with a tapped hole 16 for engaging a lead screw 14. The lead screw 14 is mounted on an outer surface of a rotary shaft 13 of the stepping motor 10 for moving the second grouped lens 2, and is threadedly inserted through the tapped hole 16 of the frame 6. The rotary shaft 13 is adapted to be rotated by driving the stepping motor 10, and the frame 6 of the second grouped lens 2 is adapted to be moved back and forth on a first reference shaft 11 along the optical axis by the rotation of the lead screw 14 and the engagement thereof with the tapped hole 16. In order to ensure precise movement of the frame 6 of the second grouped lens 2 along the optical axis, a second reference shaft 12 as a guide is fixed to the fixed plate 15. Accordingly, the second grouped lens 2 is adapted to be moved back and forth along the optical axis as being guided by the second reference shaft 12.

Further, in order to prevent the second grouped lens 2 from colliding with the first grouped lens 1, the first reference shaft 11 is fixed to the second grouped lens 2. The first reference shaft 11 is inserted through the fixed plate 15 so as to be movable relative thereto. An end point sensor 7 is fixed to a front end of the first reference shaft 11. The end point sensor 7 is formed from a Hall device for detecting that the front end of the first reference shaft 11 has contacted a rear end of the first grouped lens 1, so as to detect an initial position of the second grouped lens 2. When the front end of the first reference shaft 11 comes into contact with the rear end of the first grouped lens 1, the end point sensor 7 generates a signal of logic "1", while when the front end of the first reference shaft 11 is free from contact with the rear end of the first grouped lens 1, the end point sensor 7 generates a signal of logic "0".

As mentioned above, the stepping motor 10 is provided between the fixed plate 15 and the third grouped lens 3. When setting a moving distance D1 of the second grouped lens 2 to about 20 mm, the stepping motor 10 is sized to have a diameter of about 10 mm and a length of about 12 mm, thus permitting sufficient accommodation thereof in the lens barrel. Further, since the rotary shaft 13 and the lead screw 14 mounted thereon are provided in connection with the stepping motor 10 so as to extend along the optical axis, the lens barrel can be reduced in diameter. In addition, since the end point sensor 7 is provided at the front end of the first reference shaft 11 to detect only the initial position of the second grouped lens 2, a sufficient space can be ensured in the lens barrel. It is further advantageous that the end point sensor 7 for detecting the initial position of the second grouped lens 2 need not be an expensive sensor because the structure thereof is so simple as to only detect the contact of the first reference shaft 11 with the first grouped lens 1.

The iris 8 is adapted to be moved vertically by the iris driving motor 9 to open or close the through hole of the fixed plate 15.

The fourth grouped lens 4 is adapted to be moved by the focusing linear motor 18, and a position of the fourth grouped lens 4 is detected by a position sensor 17. The position sensor 17 is constituted of a detecting portion 17a formed from a Hall device and a driving portion 17b. The position sensor 17 is a sensor for continuously detecting the position of the fourth grouped lens 4.

Drive control of the stepping motor 10 and the focus linear motor 18 is provided by the control system shown in FIG. 2. The control system includes a control circuit 22 having a microcomputer, a control data memory 23 such as a RAM, and driver circuits 24 and 25, which are connected together as illustrated.

In this preferred embodiment, the stepping motor 10 is driven by a two-phase bipolar driving method. This driving method includes a pulse drive (e.g. a one-phase-on pulse drive, a two-phase-on pulse drive, or a half-step drive) and a two-phase sin/cos drive (e.g., a micro step pulse drive). In the pulse drive, a large torque can be obtained, and a high-speed operation of the stepping motor 10 can be effected. However, noise and vibration are somewhat large. In the micro step drive, a large torque cannot be obtained, and a high-speed operation of the stepping motor 10 cannot be sufficient effected. However, less noise and vibration are generated.

Accordingly, this preferred embodiment effectively utilizes the above advantages of the pulse drive and the micro step drive. That is, when operating the second grouped lens 2 at high speeds, the stepping motor 10 is controlled to be driven in a pulse drive mode, while when operating the second grouped lens 2 at low speeds, the stepping motor 10 is controlled to be driven in a micro step drive mode.

The control system includes a mode switch 21 for selecting either the pulse drive mode or the micro step drive mode. When the mode switch 21 is operated to select a high-speed drive terminal HIGH, a "high" level signal of a supply voltage Vcc is input into the control circuit 22, while when the mode switch 21 is operated to select a low-speed drive terminal LOW, a "low" level signal or an earth voltage is input into the control circuit 22. The control circuit 22 accommodates a program for executing the pulse drive for the stepping motor 10 and a program for executing the micro step drive for the stepping motor 10. The control data memory 23 includes a trapezoidal control data memory section 231 and a micro step control data memory section 232 for respectively storing data to be used in executing the pulse drive and the micro step drive. That is, a control signal data having a trapezoidal waveform to be applied to the stepping motor 10 for the pulse drive is stored in the trapezoidal control data memory section 231. On the other hand, a sin/cos control data for the micro step drive of the stepping motor 10 is stored in the micro step control data memory section 232.

The control circuit 22 controls a zoom position of the second grouped lens 2 through the stepping motor 10, the rotary shaft 13, the lead screw 14, the tapped hole 16 as a moving mechanism, and the second reference shaft 12. A position data of the zoom position of the second grouped lens 2 in an initial stage thereof is based on a signal of logic "1" to be output from the end point sensor 7 upon detecting that the front end of the first reference shaft 11 fixed to the second grouped lens 2 has contacted the first grouped lens 1. After receiving the logic "1" signal from the end point sensor 7, the control circuit 22 updates the position data of the zoom position of the second grouped lens 2 on the basis of a control quantity of the stepping motor 10. That is, since the stepping motor 10 carries out a precise stepping operation in response to a pulse control command from the control circuit 22, the control circuit 22 sequentially tracks and accumulates the control quantity output to the stepping motor 10, thereby calculating a present position of the second grouped lens 2. Accordingly, no complex and precise position sensor for detecting the position of the second grouped lens 2 is required as previously mentioned.

In this way, the control circuit 22 receives from the end point sensor 7 the logic "1" signal indicating a reference position of the second grouped lens 2, and updates and grasps the present position of the second grouped lens 2 on the basis of a control quantity output to the stepping motor 10. Thereafter, when a contact 27 is closed to demand a zoom operation, the control circuit 22 provides a moving control of the second grouped lens 2 to be described below.

When the low-speed drive terminal LOW of the mode switch 21 is selected, the control circuit 22 carries out the micro step drive control of the stepping motor 10 through the driver circuit 24 by using the data stored in the micro step control data memory section 232 of the control data memory 23 according to the micro step control program. Under the micro step drive control, the stepping motor 10 is driven in the micro step mode, and it is rotated slowly. Accordingly, the rotary shaft 13 is slowly rotated to thereby move the frame 6 of the second grouped lens 2 forward or reverse at low speeds through the lead screw 14. Thus, the second grouped lens 2 is moved forward or reverse at low speeds along the optical axis as being guided by the second reference shaft 12. This operation is continued while the zoom operation is demanded.

When the high-speed drive terminal HIGH of the mode switch 21 is selected, the control circuit 22 carries out the pulse drive control of the stepping motor 10 by using the data stored in the trapezoidal control data memory section 231 of the control data memory 23 according to the pulse drive control program. As a result, the stepping motor 10 is rotated at high speeds to thereby move the second grouped lens 2 at high speeds.

As mentioned above, when selecting the low-speed drive terminal LOW, the stepping motor 10 is operated at low speeds to move the second grouped lens 2 at low speeds. In this case, the generation of noise and vibration is suppressed. In contrast, when selecting the high-speed drive terminal HIGH, the second grouped lens 2 is moved at high speeds, and the noise and vibration become larger than those in the micro step mode. However, since this preferred embodiment does not employ a brush of a DC motor, a reduction gear, and a cam as used in the conventional DC motor drive, the noise and vibration in the pulse drive mode according to the preferred embodiment can be made less than those in the prior art. Further, since the movement of the second grouped lens 2 is effected by the stepping motor 10 having no brush in this preferred embodiment, a high reliability can be ensured.

Additionally, the control circuit 22 carries out an electronic cam control of both the second grouped lens 2 and the fourth grouped lens 4. In the electronic cam control, the second grouped lens 2 and the fourth grouped lens 4 are interlocked to effect a zoom and autofocus control as a whole. To realize the electronic cam control, the control circuit 22 accommodates an electronic cam control program. Further, position data to be used for the electronic cam control is stored and updated in an electronic cam data memory section 233 of the control data memory 23. The control circuit 22 calculates control quantities of the stepping motor 10 and the focusing linear motor 18 according to the electronic cam control program, and outputs the calculated control quantities through the driver circuits 24 and 25 to the stepping motor 10 and the focusing linear motor 18, respectively. In this way, the drive control of the focusing linear motor 18 is carried out in association with the drive control of the stepping motor 10. The above-mentioned electronic cam control is applicable to both the pulse drive and the micro step drive of the stepping motor 10.

It is to be understood that the present invention is not limited to the above preferred embodiment which is merely illustrative, but various modifications may be made within the scope of the invention.

For instance, the end point sensor 7 may be so arranged as to detect that the first reference shaft 11 has contacted the third grouped lens 3. Further, the rotary shaft 13, the lead screw 14 and the tapped hole 16 constituting the moving mechanism may be replaced by any other means enabling the rotation of the stepping motor 10 to be converted into the linear movement of the second grouped lens 2 along the optical axis.

While the above-mentioned preferred embodiment has been specifically applied to a video camera, the camera lens barrel of the present invention may be applied to any other similar apparatus such as a camera having a zoom function.

What is claimed is:

1. In a camera lens barrel having a first grouped lens, a movable second grouped lens for variable magnification, a third grouped lens, and a fourth grouped lens, which are respectively arranged along an optical axis, and accommodating a drive system for said first to fourth lenses, the improvement comprising:

a stepping motor having a lead screw mounted on an outer surface of a rotary shaft;

control means selectively carrying out in a low speed drive mode and in a high speed drive mode at least micro step drive control and pulse drive control of said stepping motor and providing position control of said second grouped lens according to a control quantity of said stepping motor;

a frame for the second grouped lens which is directly engaged with said lead screw, said lead screw and frame directly converting rotation of said stepping motor into movement of said second grouped lens along said optical axis; and a mode switch for selecting said high-speed drive mode or said low-speed drive mode, wherein when the high-speed drive mode is selected, said control mean carries out pulse drive control of said stepping motor, while when the low speed drive mode is selected, said control means carries out the micro step drive control of said stepping motor.

2. The camera lens barrel according to claim 1, wherein said control means includes means for calculating a position of said second grouped lens on the basis of a rotational position of said stepping motor corresponding to an end position of said second grouped lens and subsequently according to the control quantity of said stepping motor.

3. The camera lens barrel according to claim 1, wherein the pulse drive control is a one-phase-on pulse drive, a two-phase-on pulse drive, or a half-step drive control.

4. The camera lens barrel according to claim 1, wherein the micro step drive control is a two-phase sin/cos drive control.

5. The camera lens barrel according to claim 1, wherein said control means is a control system comprising:

a control circuit having a microcomputer;

a control data memory comprising a micro step control data memory section for said micro step drive control and a trapezoidal control data memory section for said pulse drive control; and a driver circuit for connecting said control circuit to said stepping motor.

6. A drive arrangements for a lens grouping, comprising:

a camera lens barrel having a first grouped lens, a movable second grouped lens for variable magnification, a third grouped lens, and a fourth grouped lens, said first to fourth lenses arranged respectively along an optical axis of said lens barrel, and a drive system for said first to fourth lenses accommodated within said lens barrel, said drive system comprising:

a stepping motor having a rotation responsive to a drive control;

means for converting rotation of said stepping motor into movement of said second grouped lens along said optical axis, said means for converting including a frame having a tapped hole in which a lead screw is engaged, said lead screw being mounted on an outer surface of a rotary shaft coupled to said stepping motor;

drive control means, including a control circuit, cooperating with said stepping motor for selectively providing a micro step drive control in a low speed drive mode for said stepping motor and a pulse drive control in a high speed drive mode for said stepping motor and providing position control of said second grouped lens according to a control quantity of said stepping motor; and means cooperating with said drive control means for selecting said high speed drive mode or a low speed drive mode for said stepping motor, wherein when the high speed drive mode is selected, the drive control means carries out pulse drive control of said stepping motor, and when the low speed drive mode is selected, the control means carries out the micro step drive control of said stepping motor.

7. The drive arrangement set forth in claim 6 wherein said control circuit includes a microcomputer accommodating a program for executing said micro step drive control and said pulse drive control, a control data memory storing data for executing said pulse drive and said micro step drive, and driver circuits cooperating with said data memory and said stepping motor.

8. The drive arrangement set forth in claim 6, wherein said control means calculates a position of said second grouped lens on the basis of a rotational position of said stepping motor corresponding to an end position of said second grouped lens and subsequently according to the control quantity of said stepping motor.

9. The drive arrangement as set forth in claim 6, wherein the pulse drive control is a one-phase-on pulse drive, a two-phase-on pulse drive, or a half-step drive control.

10. The drive arrangement as set forth in claim 6, wherein the micro step drive control is a two-phase sin/cos drive control.

11. The drive arrangement as set forth in claim 6, wherein said selecting means includes a mode switch for selecting either the pulse drive mode or the microstep drive mode.

12. A camera lens barrel comprising:

a plurality of lens groups arranged consecutively along a common optical axis including a first lens group, a second lens group, a third lens group and a fourth lens group, said first lens group and said third lens group being fixed within the lens barrel, and said second lens group and said fourth lens group being movable along said optical axis;

a stepping motor operatively coupled to a rotary shaft;

a driving circuit for driving said stepping motor;

a frame in which said second lens group is mounted, said frame including a hole formed therein;

a lead screw mounted on said rotary shaft and threadedly inserted into said hole, whereby rotation of said shaft causes said frame to move in a linear direction along said optical axis;

a sensor provided in a fixed position relative to said frame, said sensor providing a position signal indicative of a position of said sensor and said second lens group relative to the first lens group;

mode select means for providing a mode signal indicative of a desired operation mode, said operation mode being one of a high speed mode and a low speed mode; and means for controlling said driver circuit with a control quantity output and for determining the position of said second lens group along said optical axis based on said position signal, said mode signal, and said control quantity output.

13. The camera lens barrel according to claim 12 further comprising a second sensor fixed relative to said fourth lens group, said second sensor providing a second position signal to said control circuit indicative of the absolute position of said second sensor and said fourth lens group relative to the lens barrel.

14. The camera lens barrel according to claim 13 further comprising a linear motor operatively coupled to said fourth lens group, said linear motor adjusting the position of said fourth lens group along said optical axis based on the output of a second driver circuit, said second driver circuit being controlled by said control circuit based on said second position signal, whereby drive control of said stepping motor is carried out in association with drive control of said linear motor.

15. The camera lens barrel according to claim 12 wherein said second lens group is moved along said optical axis to adjust zoom, and said fourth lens is moved along said optical axis to adjust focus.

16. The camera lens barrel according to claim 12 further comprising an adjustable iris positioned along said optical axis.

17. The camera lens barrel according to claim 12 wherein said control circuit includes a microcomputer and a control data memory in which a program is stored, said program executing a desired operation mode.

* * * * *